United States Patent
Karam et al.

(10) Patent No.: US 7,457,252 B2
(45) Date of Patent: *Nov. 25, 2008

(54) CURRENT IMBALANCE COMPENSATION FOR MAGNETICS IN A WIRED DATA TELECOMMUNICATIONS NETWORK

(75) Inventors: Roger A. Karam, Mountain View, CA (US); John F. Wakerly, Oakbrook Terrace, IL (US)

(73) Assignee: Cisco Technology, Inc., San Jose, CA (US)

( * ) Notice: Subject to any disclaimer, the term of this patent is extended or adjusted under 35 U.S.C. 154(b) by 754 days.

This patent is subject to a terminal disclaimer.

(21) Appl. No.: 10/981,202

(22) Filed: Nov. 3, 2004

(65) Prior Publication Data

US 2006/0115007 A1 Jun. 1, 2006

(51) Int. Cl.
*H04B 3/00* (2006.01)

(52) U.S. Cl. .................. 370/252; 370/200; 340/538; 375/258

(58) Field of Classification Search .......... 370/252, 370/200; 340/538; 375/258
See application file for complete search history.

(56) References Cited

U.S. PATENT DOCUMENTS

| | | | |
|---|---|---|---|
| 4,835,737 A | 5/1989 | Herrig et al. | |
| 5,122,691 A | 6/1992 | Balakrishnan | |
| 5,148,144 A | 9/1992 | Sutterlin et al. | |
| 5,237,511 A | 8/1993 | Caird et al. | |
| 5,268,592 A | 12/1993 | Bellamy et al. | |
| 5,289,359 A | 2/1994 | Ziermann | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,491,804 A | 2/1996 | Heath et al. | |
| 5,531,612 A | 7/1996 | Goodall et al. | |
| 5,608,792 A | 3/1997 | Laidler | |
| 5,613,130 A | 3/1997 | Teng et al. | |
| 5,639,267 A | 6/1997 | Loudermilk | |
| 5,726,506 A | 3/1998 | Wood | |
| 5,742,513 A | 4/1998 | Bouhenguel et al. | |
| 5,758,102 A | 5/1998 | Carey et al. | |
| 5,775,946 A | 7/1998 | Briones | |
| 5,790,391 A | 8/1998 | Stich et al. | |
| 5,790,873 A | 8/1998 | Popper et al. | |
| 5,793,987 A | 8/1998 | Quackenbush et al. | |
| 5,796,185 A | 8/1998 | Takata et al. | |

(Continued)

FOREIGN PATENT DOCUMENTS

WO 96/23377 8/1996

OTHER PUBLICATIONS

International Search Report for International Application No. PCT/US2005/036328, date of mailing Aug. 3, 2006.

(Continued)

*Primary Examiner*—Brian D Nguyen
(74) *Attorney, Agent, or Firm*—Thelen LLP; David B. Ritchie

(57) ABSTRACT

In a circuit delivering common mode inline power over a pair of conductors imbalance in the current carried by the first and second conductors of the pair of conductors is detected and compensated with a bias current applied to counter the imbalance.

30 Claims, 17 Drawing Sheets

U.S. PATENT DOCUMENTS

| | | | |
|---|---|---|---|
| 5,808,660 | A | 9/1998 | Sekine et al. |
| 5,809,256 | A | 9/1998 | Najemy |
| 5,834,925 | A | 11/1998 | Chesavage |
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,087,861 | A * | 7/2000 | Cranford et al. ............. 327/108 |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,292,377 | B1 * | 9/2001 | Sasaki ......................... 363/25 |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,541,878 | B1 | 4/2003 | Diab |
| 6,701,443 | B1 | 3/2004 | Bell |
| 6,762,675 | B1 | 7/2004 | Cafiero et al. |
| 6,764,343 | B2 | 7/2004 | Ferentz |
| 6,804,351 | B1 | 10/2004 | Karam |
| 6,958,699 | B1 | 10/2005 | Karam |
| 6,986,071 | B2 | 1/2006 | Darshan et al. |
| 7,071,904 | B2 * | 7/2006 | DeCaro et al. ................ 345/76 |
| 7,089,126 | B2 | 8/2006 | Muir |
| 7,145,439 | B2 | 12/2006 | Darshan et al. |
| 7,154,381 | B2 | 12/2006 | Lang et al. |
| 7,159,129 | B2 | 1/2007 | Pincu et al. |
| 7,162,377 | B2 | 1/2007 | Amrod et al. |
| 2003/0058595 | A1 * | 3/2003 | Murabayashi et al. ......... 361/90 |
| 2004/0049321 | A1 | 3/2004 | Lehr et al. |
| 2004/0073597 | A1 | 4/2004 | Caveney et al. |
| 2004/0124910 | A1 * | 7/2004 | Chuang et al. .............. 327/541 |
| 2004/0146061 | A1 | 7/2004 | Bisceglia et al. |
| 2004/0260794 | A1 | 12/2004 | Ferentz et al. |
| 2005/0132240 | A1 | 6/2005 | Stineman, Jr. et al. |
| 2005/0197094 | A1 | 9/2005 | Darshan et al. |
| 2005/0257262 | A1 | 11/2005 | Matityahu et al. |

OTHER PUBLICATIONS

Invitation to Pay Additional Fees (Partial International Search), Application No. PCT/US2005/036328, date of mailing May 26, 2006.

Mendelson, G., White Paper "All You Need to Know About Power Over Ethernet (PoE) and the IEEE 802.3af Standard", pp. 1-24, Jun. 2004.

"3Com User Guide," 3Com Network Jack, Model NJ200, Version 1.0, 3Com, Sep. 2002.

International Search Report for International Application No. PCT/US2005/036329, date of mailing Sep. 4, 2006.

International Preliminary Report on Patentability Application No. PCT/US2005/036328, date of mailing May 18, 2007.

Lynn, K., "Universal Serial Bus (USB) Power Management," Wescon Conference, IEEE, Sep. 1998, pp. 194-201.

"IEEE Standard 802.3af™", IEEE Standard for Information Technology-Telecommunications and Information Exchange Between Systems-Local and Metropolitan Area Networks-Specific Requirement, IEEE The Institute of Electrical and Electronics Engineering, Inc., Jun. 18, 2003.

"3Com® NJ100 Network Jack Power", printed from http://www.poweroverethernet.com/manual/content/view/full/776/, 3Com, Tuesday, Mar. 18, 2003.

3Com User Guide-3Com IntelliJack, Model NJ220, Version 1.0, 3Com, Nov. 2003.

International Search Report for International Application No. PCT/US2005/036392, date of mailing Mar. 10, 2006.

* cited by examiner $R = 3.3\Omega$
$C = 0.22\mu F$

CURRENT IMBALANCE COMPENSATION FOR MAGNETICS IN A WIRED DATA TELECOMMUNICATIONS NETWORK

STATEMENT OF RELATED CASES

This patent may be considered to be related to commonly owned U.S. patent application Ser. No. 10/961,864 filed on Oct. 7, 2004 and entitled "Bidirectional Inline Power Port" in the names of inventors Daniel Biederman, Kenneth Coley and Frederick R. Schindler (now U.S. Pat. No. 7,363,525 patented Apr. 22, 2008).

This patent may also be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may also be considered to be related to commonly owned U.S. patent application Ser. No. 10/961,904 filed on Oct. 7, 2004 and entitled "Inline Power-Based Common Mode Communications in a Wired Data Telecommunications Network" in the names of inventors Roger A. Karam, Frederick R. Schindler and Wael William Diab.

This patent may also be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero.

This patent may also be considered to be related to commonly owned U.S. patent application Ser. No. 10/982,383 filed on Nov. 5, 2004 and entitled "Power Management for Serial-Powered Device Connections" in the name of inventor Roger A. Karam.

This patent may also be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may also be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero.

This patent may also be considered to be related to commonly owned U.S. patent application Ser. No. 10/981,203 filed on Nov. 3, 2004 and entitled "Powered Device Classification In A Wired Data Telecommunications Network" in the name of inventors Roger A. Karam and John F. Wakerly.

This patent may also be considered to be related to commonly owned U.S. patent application Ser. No. 10/845,021 May 13, 2004 and entitled "Improved Power Delivery over Ethernet Cable" in the names of inventors Wael William Diab and Frederick R. Schindler.

This patent may also be considered to be related to commonly owned U.S. Pat. No. 6,541,878 entitled "Integrated RJ-45 Magnetics with Phantom Power Provision" in the name of inventor Wael William Diab.

Patent may also be considered to be related to commonly owned U.S. patent application Ser. No. 10/850,205 filed May 20, 2004 and entitled "Methods and apparatus for Provisioning Phantom Power to Remote Devices" in the name of inventors Wael William Diab and Frederick R. Schindler (now U.S. Pat. No. 7,353,407 patented Apr. 1, 2008).

This patent may also be considered to be related to co-pending commonly owned U.S. patent application Ser. No. 10/033,808 filed Dec. 18, 2001 and entitled "Signal Disruption Detection in Powered Networking Systems" in the name of inventor Roger A. Karam.

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired data telecommunications network (such as, for example, the well-known Ethernet) from power source equipment (PSE) to a powered device (PD) over a link section. The power may be injected by an endpoint PSE at one end of the link section or by a midspan PSE along a midspan of a link section that is distinctly separate from and between the media dependent interfaces (MDIs) to which the ends of the link section are electrically and physically coupled.

PoE is defined in the IEEE (The Institute of Electrical and Electronics Engineers, Inc.) Standard Std 802.3af-2003 published Jun. 18, 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission and reception (collectively: "transceiving") of Ethernet packets with the transmission and reception of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, floating 48 Volt power currently available at a range of power levels from about 4 watts to about 15 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1-2, Pair 3-4 or Pair 1-2+Pair 3-4. In the circuit shown in FIG. 1E a PD associated with Pair 1-2 is powered by Inline Power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline Power is also available through techniques that are non-IEEE 802.3 standard compliant as is well known to those of ordinary skill in the art.

In many cases where PDs are used, it may be desirable to provide some redundancy in terms of data and/or power delivery for cases in which equipment (hubs, switches, cable and the like) providing the power and/or data fails to continue to do so.

SUMMARY OF THE INVENTION

In a circuit delivering common mode inline power over a pair of conductors, imbalance in the current carried by the first and second conductors of the pair of conductors is detected and compensated with a bias current applied to counter the imbalance.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention described in the following detailed description are directed at current imbalance compensation for magnetics in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
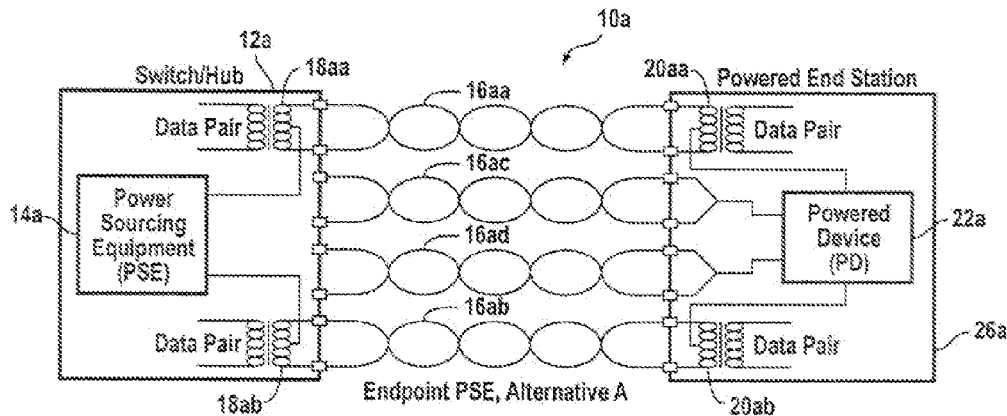
FIGS. 1A, 1B, 1C, 1D and 1E are electrical schematic diagrams of portions of data telecommunications networks in accordance with the prior art.
Figure 1B:
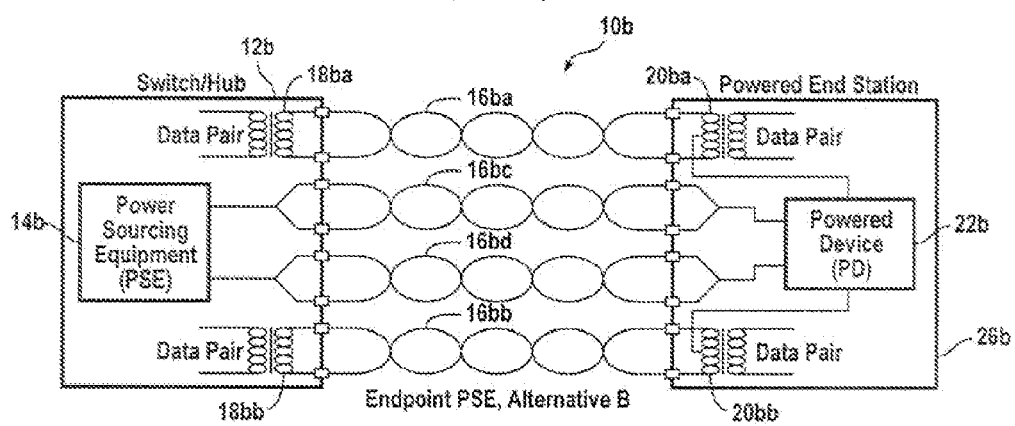
Figure 1C:
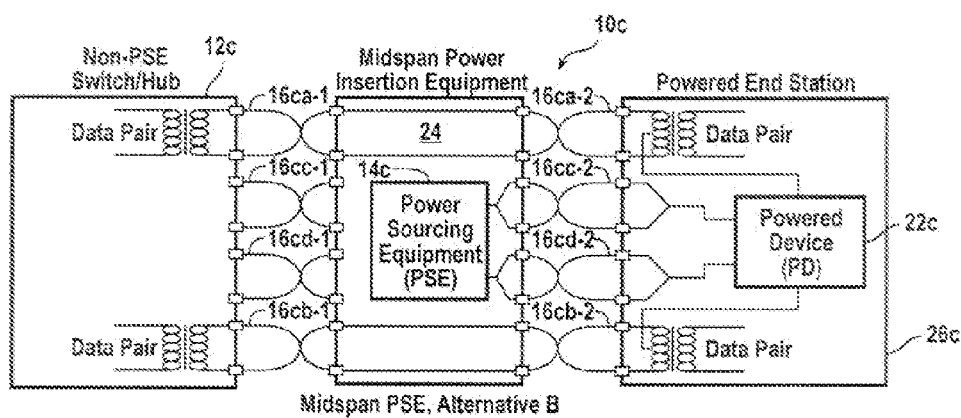
Figure 1D:
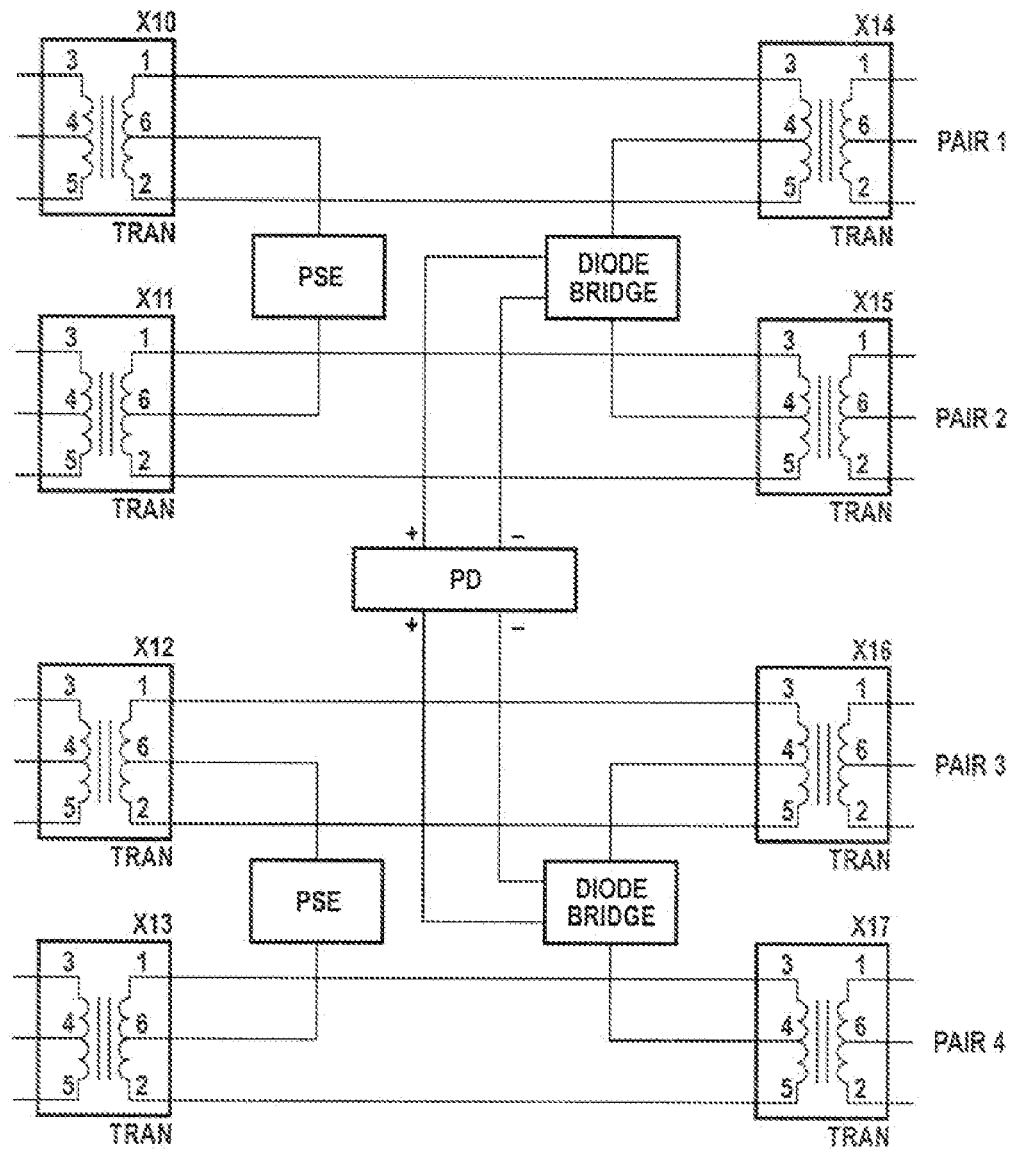
Figure 1E:
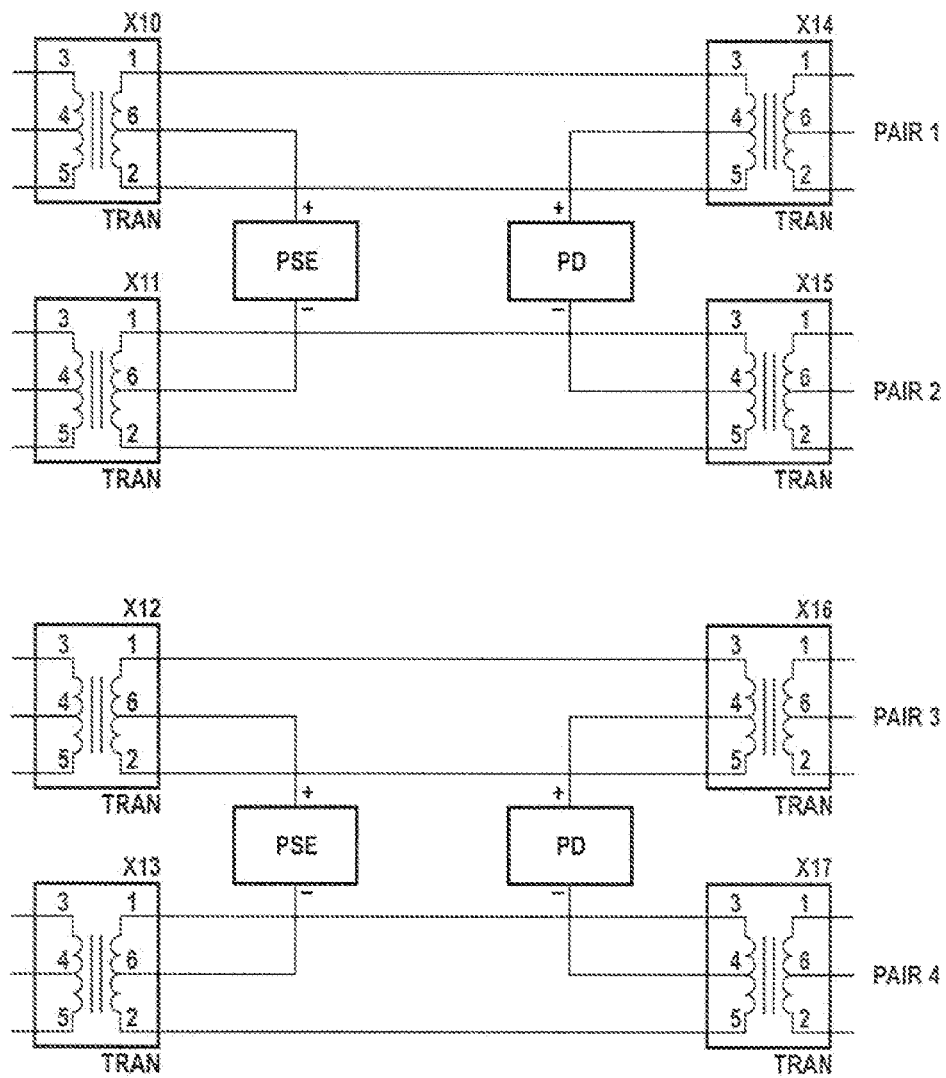
Figure 2:
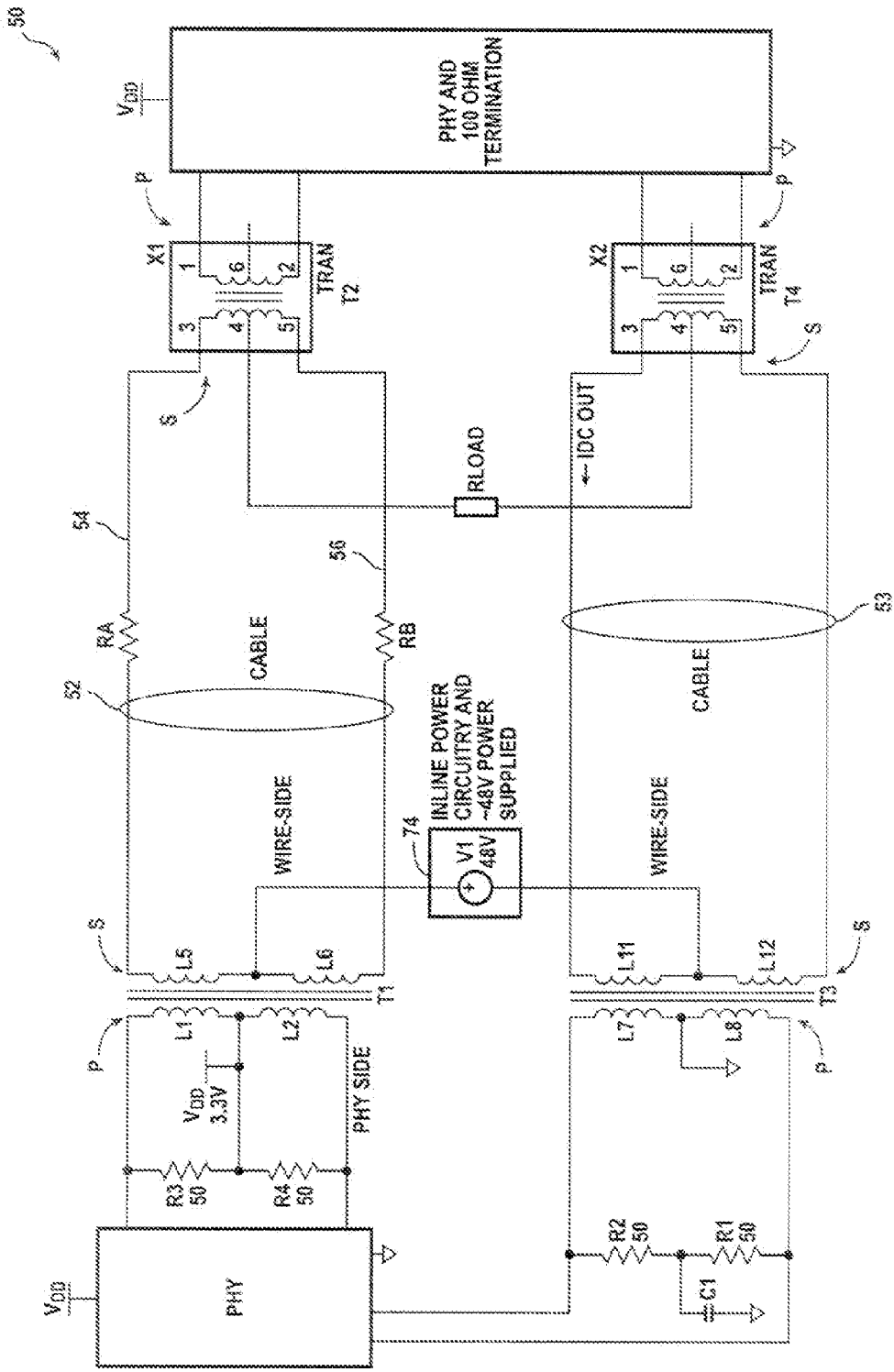
FIG. 2 is an electrical schematic diagram of a segment of a wired data telecommunications network comprising two pairs of conductors adapted for transmission of inline power.

Turning now to FIG. 2 a network segment 50 is illustrated. Network segment 50 comprises a first pair of conductors 52 comprised of first conductor 54 and second conductor 56 and a second pair of conductors 53. On either side of the pair of conductors is a center-tapped transformer T1 and T2. The primary winding P of transformer T1 is coupled to a PHY and the secondary winding S is coupled via a coupler such as an RJ-45 connector to the first pair of conductors (wire side). When a direct current (DC) signal such as an inline power signal is transmitted using common mode inline power transmission some current will traverse the first conductor 54 and other current will traverse the second conductor 56. Ideally that current would be the same, however Ohm's law dictates that any difference in the resistance between the two legs of the pair of conductors 52 will force more current into one than travels through the other. Here the resistance in the two legs is illustrated by the resistors $R_A$ and $R_B$. $R_A$ and $R_B$ can be influenced in a twisted pair network connection by cable length, variations in the cable material, bends in the cable, corrosion in the connectors at either end of the network segment, mismatches in the winding resistance within a magnetic device due to wire-diameter mismatch, and the like. Accordingly, $R_A$ and $R_B$ often differ somewhat. Where the cables are relatively long, the difference is often less important than where the cables are relatively short due to the swamping effect of the larger resistance of a longer cable.

A difference in the inline power current within the two conductors of a twisted pair can lead to a phenomenon known as droop. Where there is a substantial current imbalance between the two sides on either side of the center tap in a central-tapped magnetic device such as one of transformers T1 and T2 then saturation in the magnetic device can cause the data signals which pass through the transformers to become distorted. The windings on either side of the center tap are normally wound in opposite directions, so that if equal DC currents flow towards the center tap from either side, the net DC current seen by the transformer core is zero. If the currents are not equal, the transformer core sees a nonzero current, and a sufficiently large current causes degradation of the transfer characteristic of the transformer, the phenomenon known as droop. When the droop is sufficiently large the distortion can affect the data throughput on the network segment leading to data errors.

Even if currents are equal, droop may occur due to imprecision in the manufacture of the transformer, e.g., if the number of turns on either side of the center tap is not precisely the same. Thus, an effective current imbalance and corresponding droop may be due to an actual current imbalance or may be due to imprecision in the manufacture of the transformer, or both. Some of the apparatus and methods described in this disclosure detect droop and therefore can compensate for an effective current imbalance regardless of its cause. Others rely on a measurement of actual current imbalance and will not compensate for imprecision in transformer center tap positioning.

Figure 3:
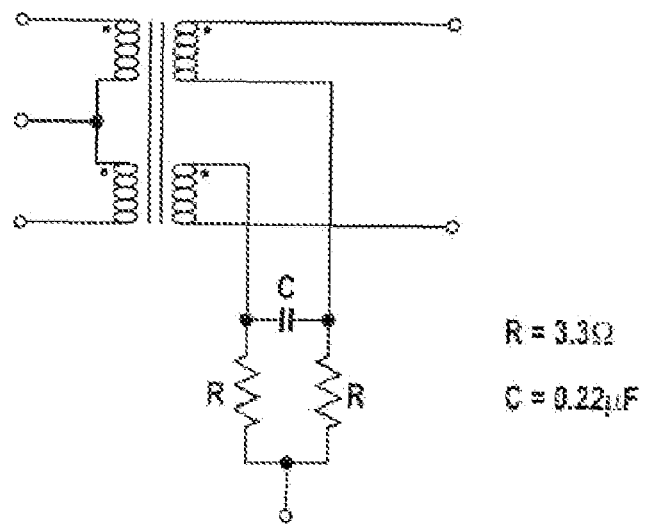
FIG. 3 is an electrical schematic diagram of a current compensation technique in accordance with the prior art.

For relatively small inline power currents there will be correspondingly small amounts of droop and the problem will usually be insignificant. For example, the IEEE 802.3af standard at Annex 33E suggests that current balance can be achieved by using the ballast arrangement illustrated in FIG. 3. Power dissipation in resistors, however, is given by $P=I^2R$. The parallel 3.3 ohm resistances proposed by the standard will dissipate about 0.2 watt per powered pair while such a circuit delivers 350 mA (roughly 40 watts of waste heat dissipation for a 48 port device with all four pairs carrying power). However, as inline power technology is adapted to provide larger and larger currents, this problem increases with the square of the current. Thus at 1000 mA of current per pair, the same device would have to dissipate over 300 watts. Accordingly, for larger inline power levels, the ballast-type approach suggested in the IEEE 802.3af standard will soon become impractical due to the unacceptably high levels of waste heat (and wasted electrical power).

Figure 4A:
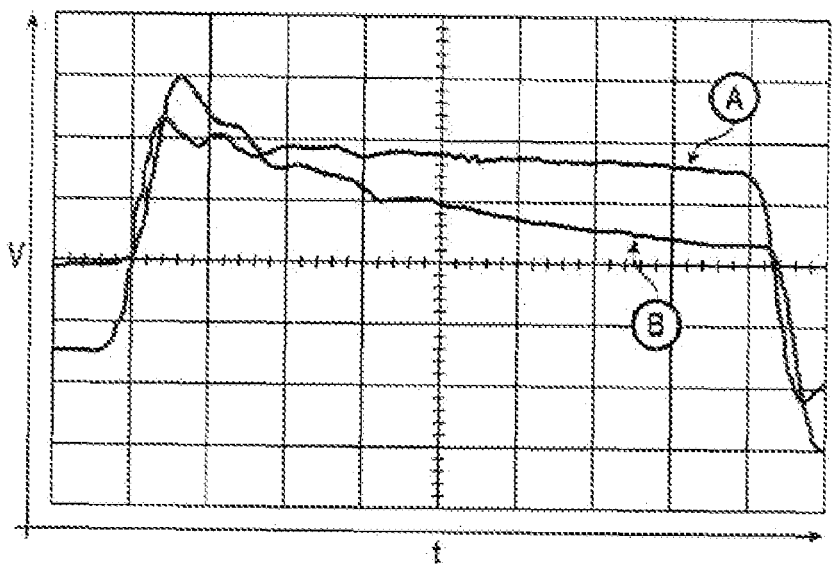
FIGS. 4A and 4B are graphs illustrating the effects of inline power current imbalance and imbalance compensation on data transmitted over the inline power conductors.
Figure 4B:
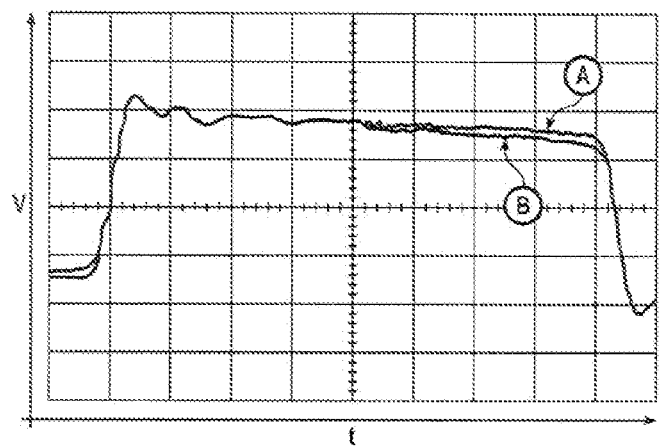

FIGS. 4A and 4B illustrate the problem of droop. Curve A of FIG. 4A is an illustration of a data signal pulse not impacted by droop. Curve B of FIG. 4A is an illustration of a distorted data pulse where the distortion is caused by a transformer subjected to a 50 mA current bias on one leg which forces a current imbalance in the transformer and causes a droop of over two 200 mV divisions. (Note that the curves are offset by a DC offset of about 1.5 divisions for clarity). As can be seen by inspection, Curve A is relatively well behaved and stays within a range of well less than 200 mV (one division) during its on-time, whereas Curve B is relatively badly behaved varying over about three times as much in amplitude during its on-time. FIG. 4B illustrates the correction of the droop by compensating for it by applying another 50 mA signal (causing a countering DC current) to the other leg of the transformer. Curve A of FIG. 4B is the essentially the same as Curve A of FIG. 4A.

Detection of droop is described, for example, in co-pending and commonly owned U.S. patent application Ser. No. 10/033,808 filed Dec. 18, 2001 and entitled "Signal Disruption Detection in Powered Networking Systems" in the name of inventor Roger A. Karam. That application is hereby incorporated herein by reference as if set forth fully herein.

Figure 4C:
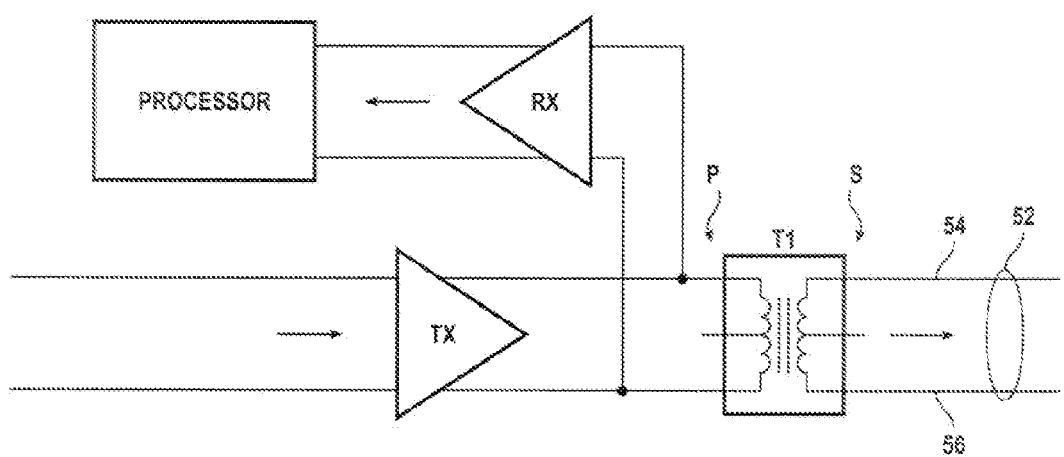
FIG. 4C is an electrical schematic diagram of a portion of a transmitter section of an apparatus in accordance with an embodiment of the present invention.

In accordance with one embodiment of the present invention, droop is measured, compensation current is applied, and the droop is thereby reduced. The droop may be measured by coupling a receiver to the transmitter output at the PHY. This is illustrated at FIG. 4C. Transmitter TX transmits a differential AC signal into the primary of transformer T1. An effective current imbalance in current carried by conductors 54 and 56 on the wire side of transformer T1 (forming a circuit element) may cause signal droop. That droop will be present on both the primary and the secondary of transformer T1. Receiver RX is coupled to receive and monitor the signal transmitted by transmitter TX as shown. A processor (or other suitable circuit) determines if there is droop by comparing the (possibly) distorted pulse (or characteristics thereof) to an expected or ideal pulse (or characteristics thereof). This may be done, for example, by measuring the peak amplitude or the amplitude at some point in the pulse, for example, near the end of the pulse where the droop usually tends to be more pronounced. This amplitude is compared to the expected or desired amplitude and a difference error signal related to the magnitude of the droop is generated. This is applied to a feedback loop which applies a correcting DC current to an appropriate node of the circuit (as discussed below) in order to counter the unbalanced current flow on the wire side of the magnetic device and thereby bring the difference error signal to zero or nearly zero and so reduce the droop and correct the shape of the pulse. As discussed herein the measurement of the droop and/or effective current imbalance may take place on either the primary side or the secondary side of the magnetic device T1 and the correcting DC current may be induced on the primary side of the magnetic as with a third winding on the primary side of magnetic device T1 or by direct current injection or induced current injection on the secondary side (wire side) of magnetic device T1.

Figure 5:
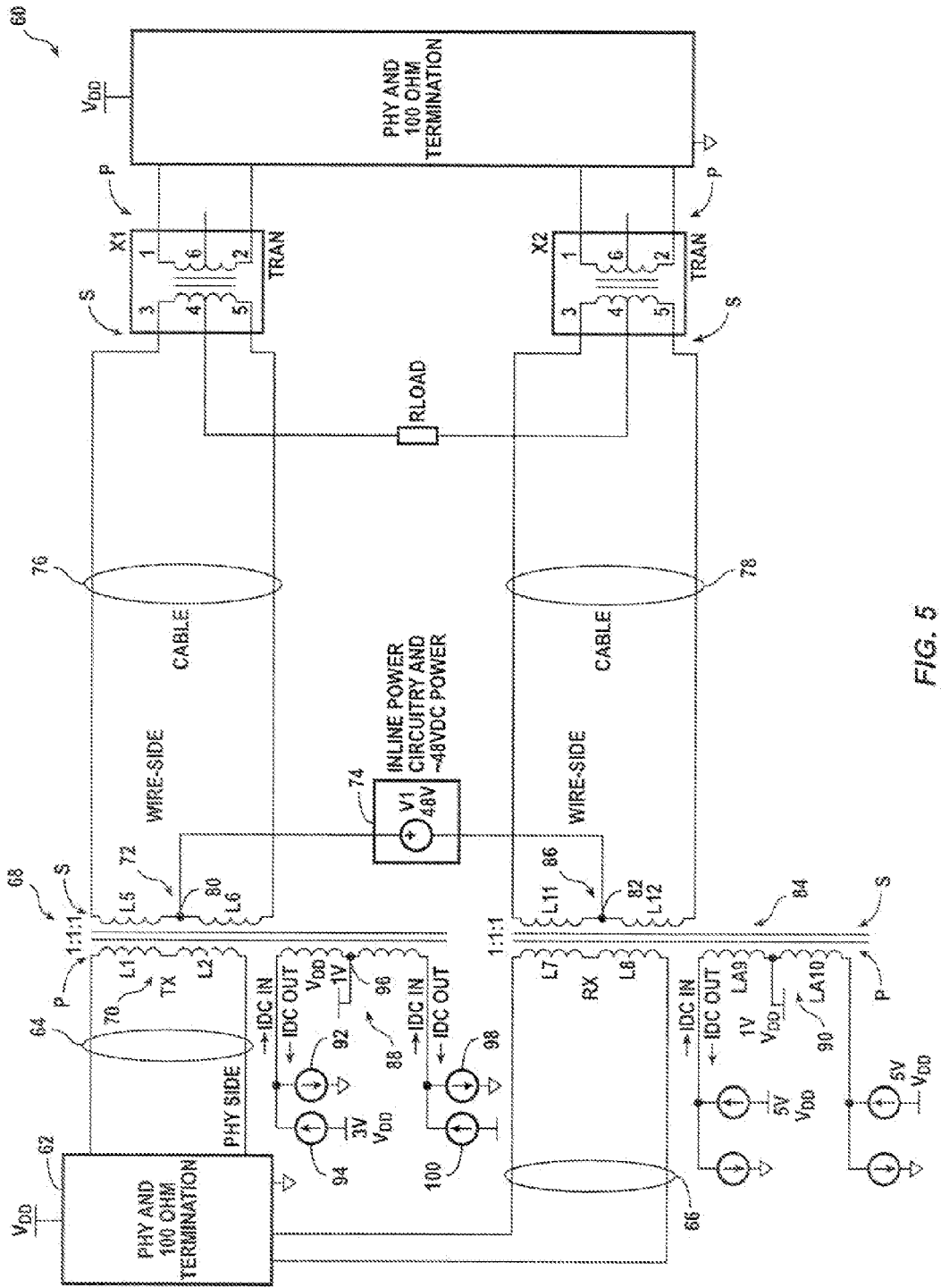
FIGS. 5, 6, 7, 8, 9, 10, 11, 12 and 13 are electrical schematic diagrams of various current compensation schemes in accordance with embodiments of the present invention.

Turning now to FIG. 5, an embodiment 60 of the present invention is shown in schematic diagram form. Note that while this figure illustrates two pairs of conductors, the invention includes implementations operating on one or more pairs of conductors and is intended to include, for example, both two pair and four pair Ethernet embodiments such as 10 Base T, 100 Base T, 1000 Base T and higher. The embodiments of the present invention may easily be implemented at the PSE side (e.g., a network hub or switch), however, they may be implemented at either the PSE or the PD, or even in the middle of the cable run, if desired. If implemented on both sides, an auto-negotiation process to allow one side to act while the other allows it to act is necessary to avoid a situation where both sides are trying to compensate for unbalanced current at the same time (and possibly making the situation worse).

In the case of 10 Base T and 100 Base T Ethernet, data transmission takes place over two pairs in the cable. In accordance with one embodiment of the present invention where PHY-based detection and correction takes place, the PHY's IEEE 802.3 auto-negotiation process that happens ahead of any data transmission and after the far end device (e.g., a PD) has been inline-powered, allows both sides of the link to exchange extra information via the Next Page protocol of the IEEE 802.3 auto-negotiation process, or, using proprietary pulses in a similar manner. Such 'information' exchange allows both sides to agree whether one side will do the current correction, or both, or neither. If the agreement is reached to do the sense for droop and the current imbalance correction on one side of the link, the PHY (i.e., element 62 shown in FIG. 5) or similar circuitry would be responsible for correcting an effective current imbalance on both pairs potentially using the data pulses, especially if it is determined that the inline power device is not capable of correcting current imbalance (i.e., no auto-negotiation reply is received indicating such a capability at the far end device). The single-sided effective current imbalance correction can take place in at least two ways: (1) the local PHY transmits on both its Transmit and Receive channels either data or a special droop detection pulse or pulses designed to be wide enough in width (time—e.g., 400-1000 nSec in one embodiment) to highlight the droop without appearing to be data pulses, and the effective current imbalance is measured leading to the proper correction through a conventional feedback circuit; or (2) the data pulses themselves are used for sensing the effective current imbalance allowing the local receiver to automatically cause the application of the proper correction, since it can detect both data errors and droop. Note that data pulses have different frequency content and may not all be affected by droop in the same way, potentially making it harder to sense the droop on all data pulses, hence it may be desirable at least in some circumstances to use out of band (non-data) droop detection pulses for this purposes. Also, if the local receiver does not sense any errors, the circuitry may opt out of the correction process (this can be an appropriate choice where the cable between the two devices is long enough that any current imbalance present does not affect the data due to the swamping effect of the long cable resistance, or under certain conditions where the SNR (signal to noise ratio) is acceptable for data communications purposes.

In accordance with another embodiment of the present invention, the two sides may negotiate to have their respective transmitter's imbalance corrected locally. This is done in the same way using the local PHY or similar circuitry by acting on transmitted data pulses or droop detection pulses, as discussed above, to correct for the imbalance. By sharing the correction process among them, 10/100 devices will 'attach' the correction to the local transmitter, allowing it the flexibility of controlling the test signal and increasing the accuracy of the current sense since no cable attenuation is involved.

In the case of 1000 Base T Ethernet or other technologies that use 4-pair transmission, the same methods mentioned for 10/100's negotiation of which device will do the correction apply. The difference here is that current imbalances on two extra pairs need to be corrected. In this case one side may handle one of the pairs dedicated for 10/100, while the link partner handles the second pair, or a single side may be responsible for the full 4-pair correction.

In general, the effective current imbalance correction can be either (1) continuously adaptive (i.e., it automatically corrects at any time an effective current imbalance is presented (such as due to changes in temperature, power load level, transmission speed, and the like); or (2) fixed (i.e., it corrects/calibrates once ahead of data transmission, after the PD is powered up, and possibly revisits the correction of a potential imbalance if the PSE or the PD communicates power requirement changes, if the link goes down, the cable has been unplugged, local receive errors are detected, software/firmware determines a need to re-correct, and the like). The correction for effective current imbalance can be active at all times, or enabled/disabled via software/firmware.

Alternatively, the correction process may be set up to initiate when the PHY detects idle periods where no data transmission is taking place. During such idle periods it would initiate the sense and correct algorithm without taking the link down since it takes much more than a few 100's of nanoseconds to cause the link test to fail in these technologies (i.e., the PHY would transmit its test pulse, and switch back to the transmission of idles or whatever signals it needs to send out to indicate the presence of a link partner). Where the wire side-based sense and correct method is used, then the data may not be directly involved since the current sense circuitry automatically does the task without a need to interpret data pulse distortion.

A device such as a PHY desiring to send (or receive) data over a pair of conductors (such as a twisted pair of conductors) typically does so through a transformer using differential signaling. This is illustrated in detail in the various embodiments discussed in conjunction with FIG. 1A-FIG. 1E. Where common mode inline power delivery is provided, the transformers may be center-tapped transformers or a pair of inductors with a center node emulating a center-tapped transformer. In any event, in accordance with the embodiment of FIG. 5, the invention adds a third winding in addition to the primary and secondary windings of the transformer(s) and, in response to detected current imbalances, current sources and/or sinks coupled to such third windings induce current flow in the pair of conductors 76 which counters the imbalance and acts to reduce or eliminate signal droop due to transformer saturation and the like.

In FIG. 5, PHY 62 has a transmit differential pair of conductors 64 and a receive differential pair of conductors 66. A first transformer or magnetic device 68 includes a PHY-side primary winding 70 which is usually center-tapped so that the center tap node may be biased to a fixed voltage such as ground. On the wire side of the magnetic device 68 is secondary winding 72 which is center-tapped so that inline PSE power circuitry 74 may couple common mode DC power to the differential pairs of conductors 76 and 78 via center taps 80 and 82, respectively, of magnetic device 68 secondary winding 72 and magnetic device 84 secondary winding 86. Current imbalance in pair 76 is detected in this embodiment by PHY-based monitoring of the outgoing pulses. Current imbalance in pair 78 is detected by observing droop in the signals received at PHY 62. Current correction is applied via third windings 88 and 90 of magnetic devices 68 and 84, respectively. There are a large number of ways to apply compensating current. Shown in FIG. 5 are a first current sink 92 and a first current source 94 both connected to a third winding on the primary side of magnetic device 68 with a center tap node 96 held at a fixed voltage. Similarly, the other end of winding 88 has a current sink 98 and a current source 100. These current sources and sinks may be arranged to deliver precisely the correct amount of current in the correct direction to compensate for the current effective imbalance in conductor pair 76. A similar arrangement is provided at third winding 90 as shown. This need not be so elaborate and in FIG. 6 a similar approach uses a single current source 102 and a current sink 104 coupled in series with a third winding 106 of transformer 68a.

Note that the current sources and sinks used may be simple transistors or pairs of transistors such as MOSFETs configured as sources/sinks as well known to those of ordinary skill in the art and that they should appear as high impedance, i.e., >>1000 ohms up to 100 MHz and they supply only DC current needed to adjust the imbalance on the wire side.

Figure 6:
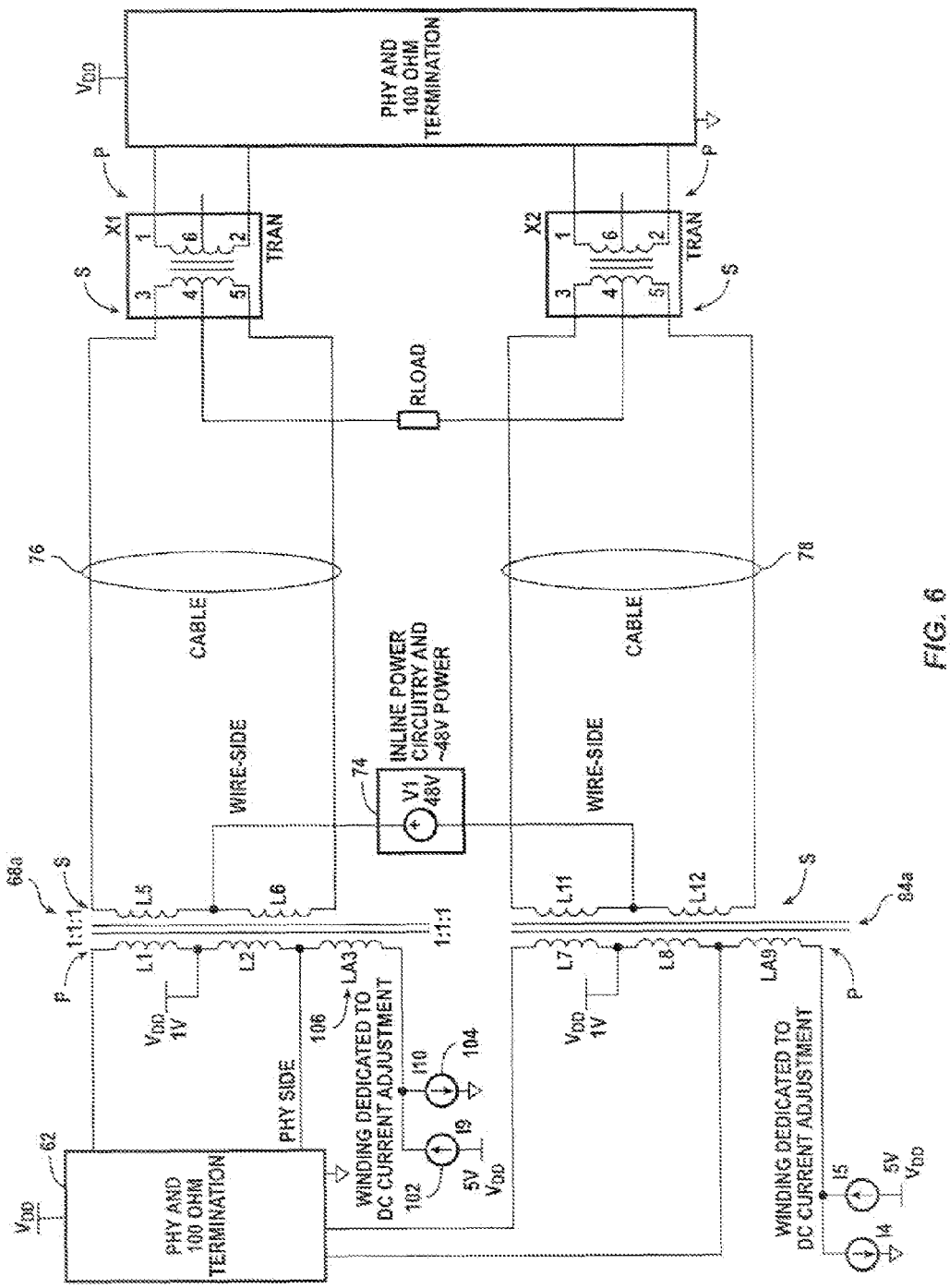
Figure 7:
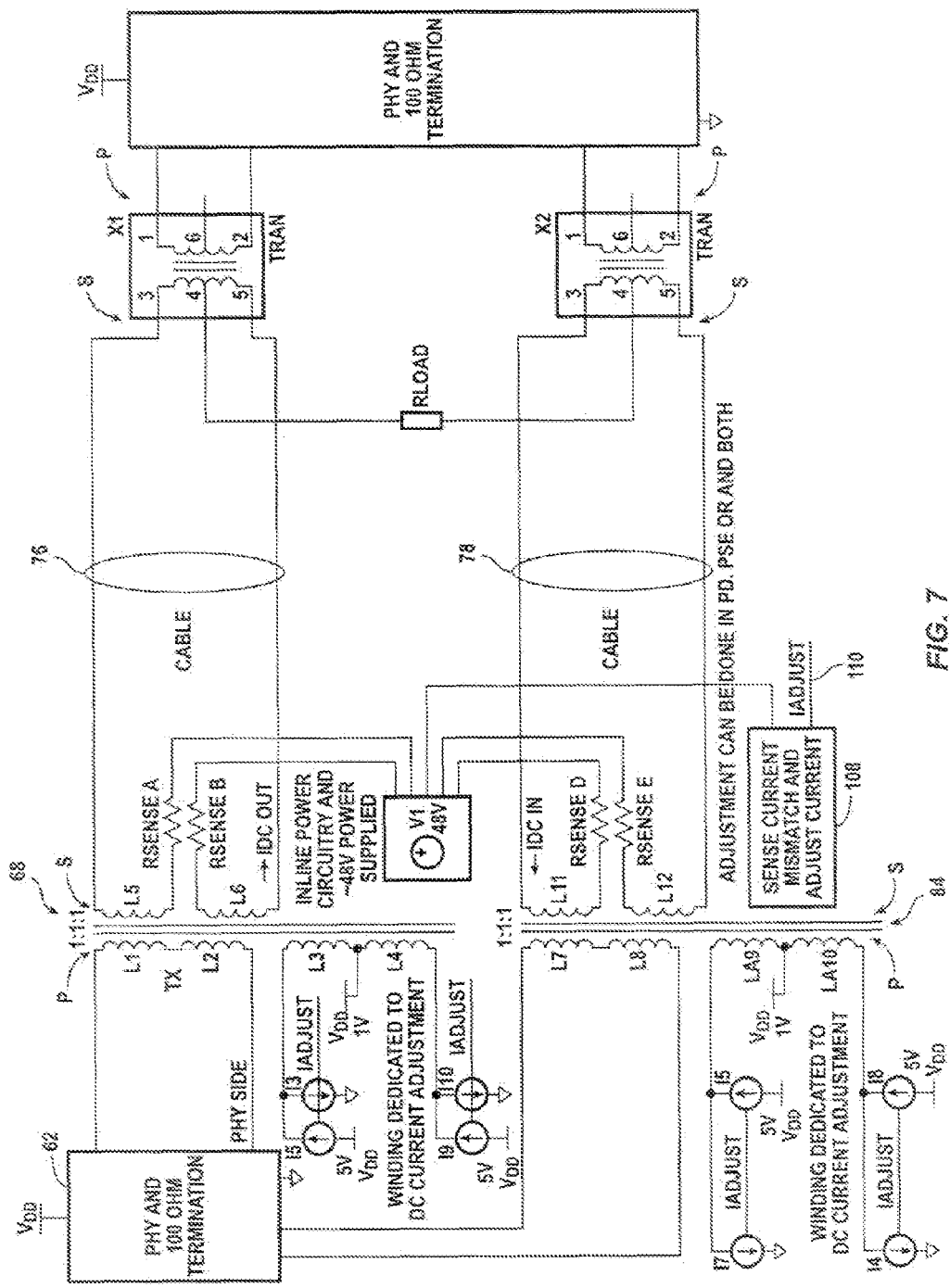

Turning now to FIG. 7, another embodiment of the present invention is presented. In accordance with this embodiment, current adjustment operates much like the embodiments of FIG. 5 or FIG. 6, however, current imbalance is sensed directly on the secondary (wire) side rather than indirectly on the primary side by inspection of pulse distortion effects. Instead of using a center-tapped secondary winding at magnetic device 68, the secondary winding is split as shown and each leg has a current sensor in it, here shown as a current sense resistor Rsense. Note that the resistance of Rsense may be much less than the 3.3 ohms of the ballast resistor R shown in FIG. 3, e.g., about 1 ohm in one embodiment of the present invention, so this arrangement washes less power than that of the prior art. The terminals of the current sensor are coupled (not shown) to a voltage monitoring circuit (which may be included in block 108) to sense the voltage drop across the sense resistor. This is indicative of current. Other techniques for current measurement may alternatively be employed such as Hall Effect sensors, and the like, as will now be appreciated by those of ordinary skill in the art. An adjust signal on one or more lines 110 is generated at block 108 to control the current sinks and sources associated with the current compensation circuitry on the primary side of the magnetic devices. When the block 108 determines that current is balanced, it may hold the setting for the adjust signal until requested to adjust the balance again as discussed above.

Figure 8:
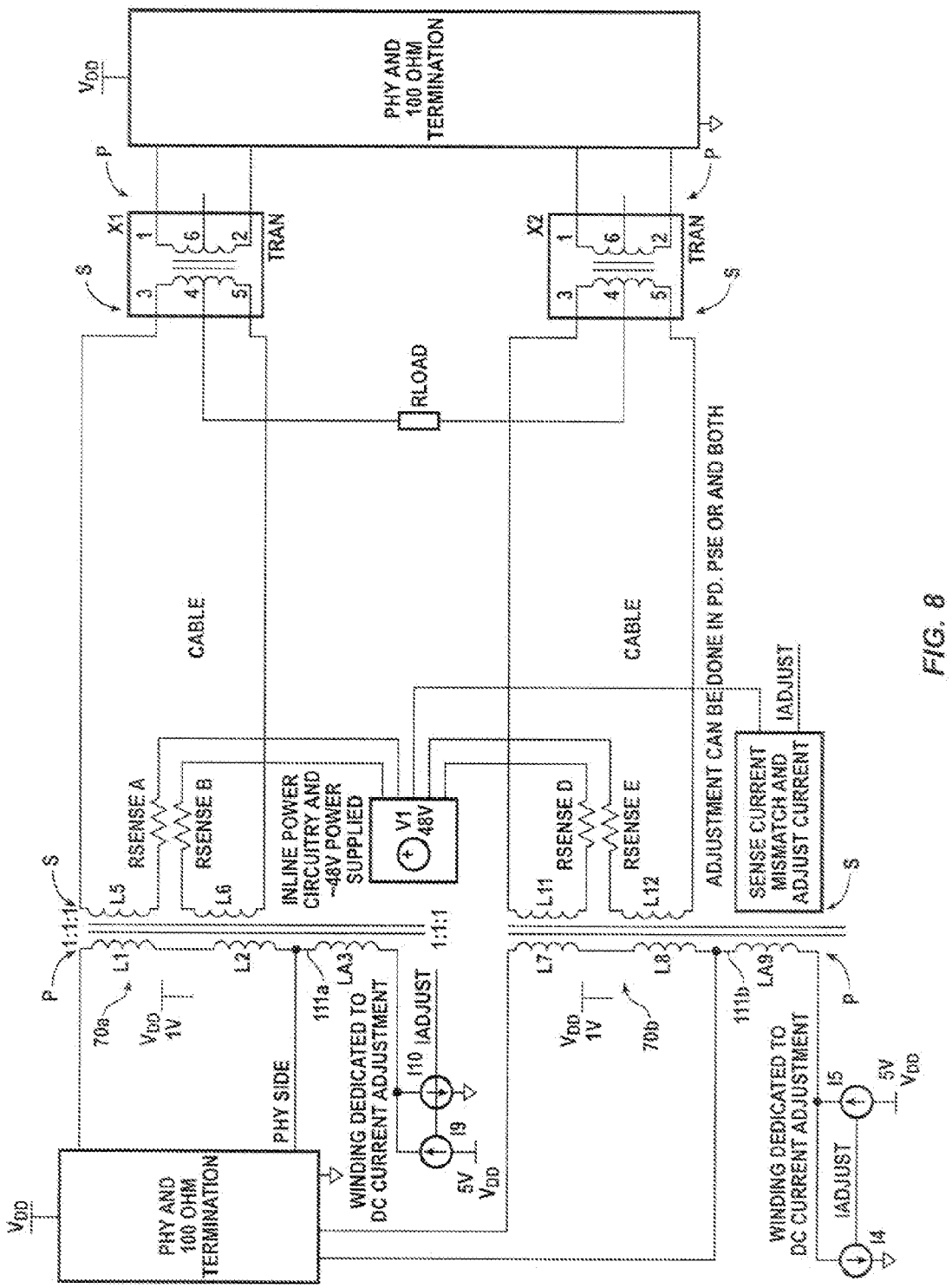

Turning now to FIG. 8, a version of the embodiment of FIG. 7 is presented using the simplified current sink/source approach first illustrated in FIG. 6. Note that third windings 111a and 111b are coupled in series with respective primary windings 70a and 70b.

Figure 9:
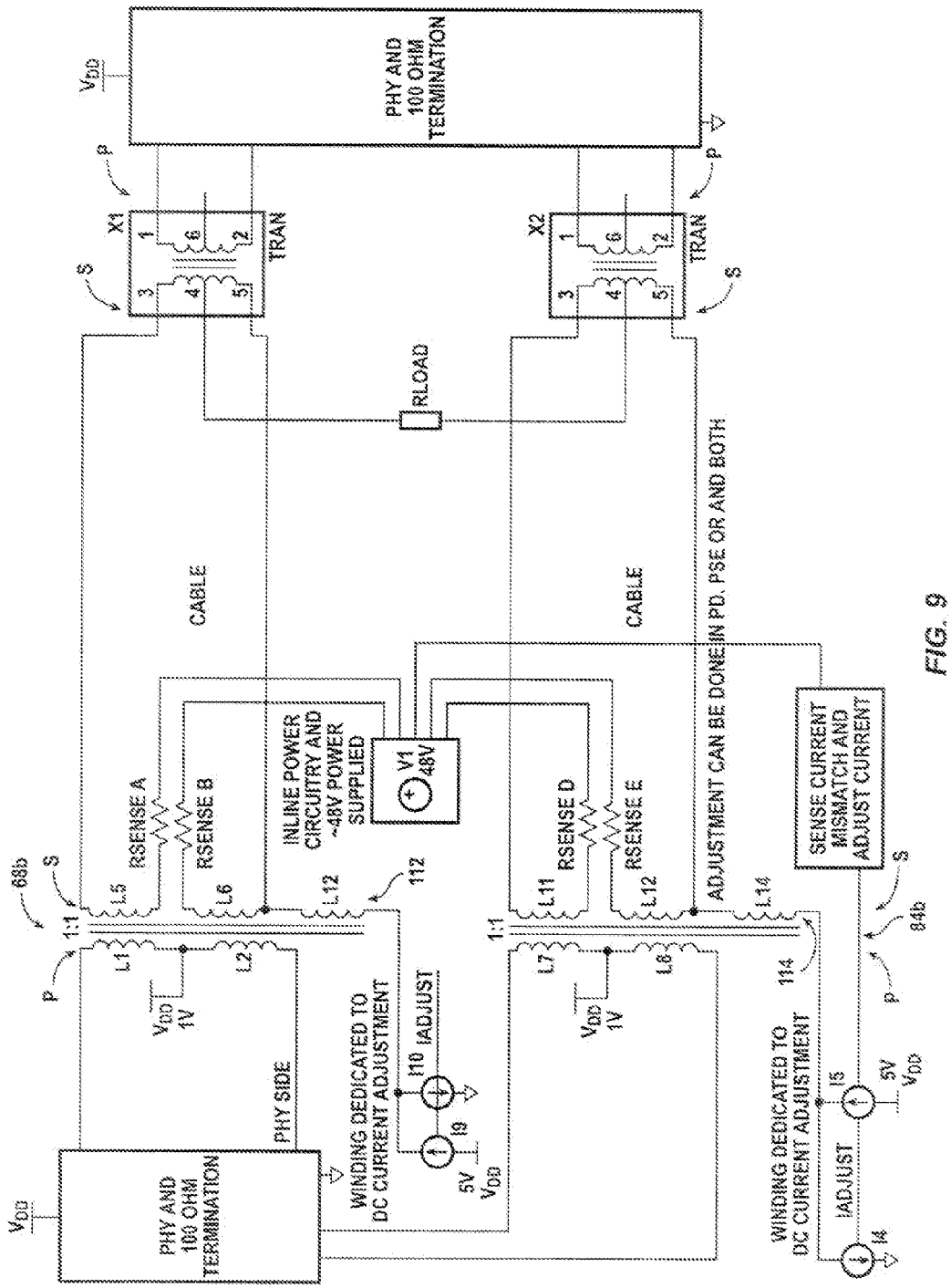

Turning now to FIG. 9, another embodiment of the present invention is presented. In accordance with this embodiment, current compensation is provided by third windings 112, 114 on the wire side (secondary side) of the magnetic devices 68b, 84b. Current is sensed directly on the wire side as in FIGS. 7 and 8, however the current sink/source arrangement provides current to third windings 112, 114 on the secondary (wire) side rather than a third winding on the primary side as in FIGS. 5, 6, 7 and 8.

Figure 10:
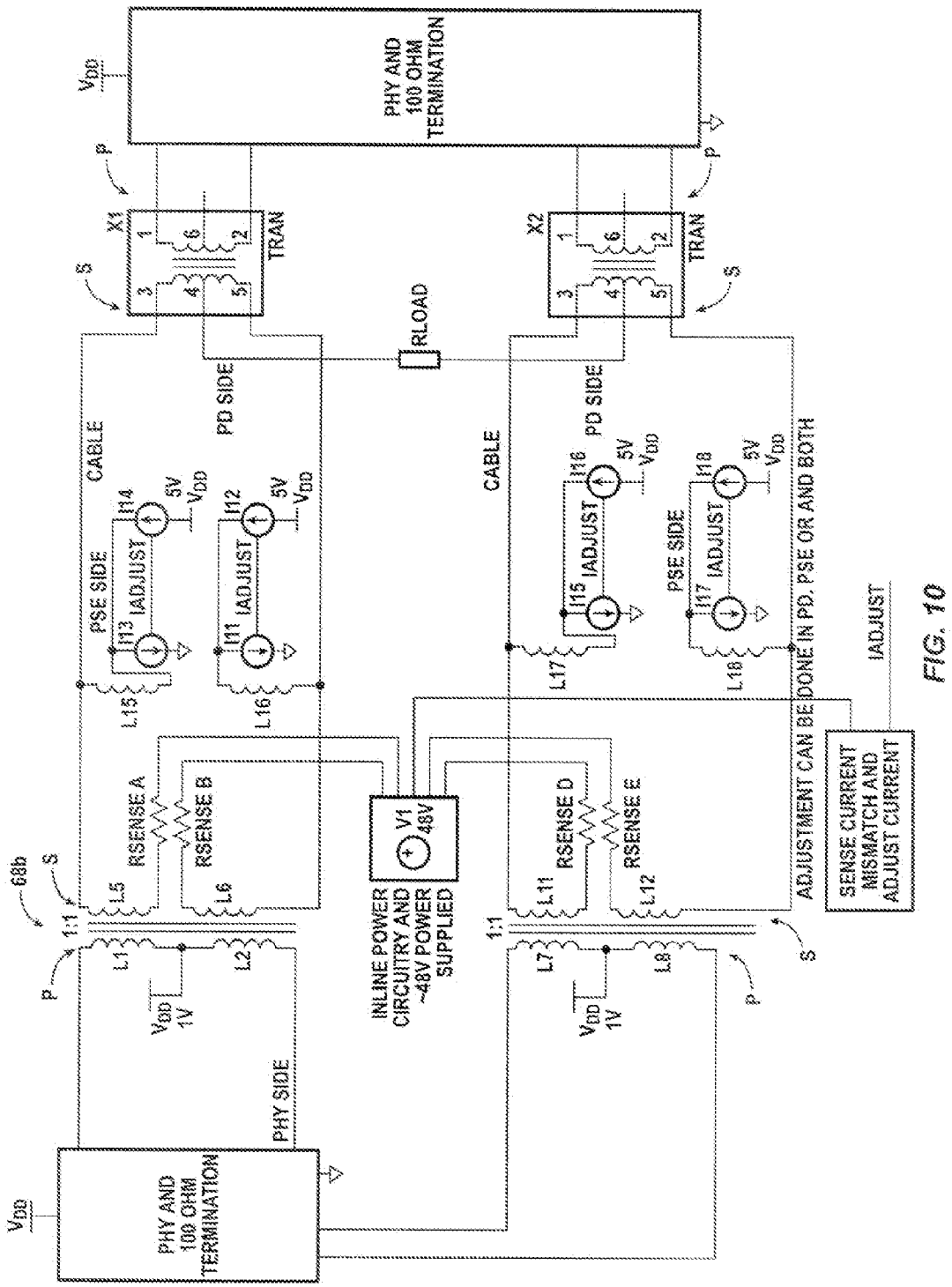

Turning now to FIG. 10, another embodiment of the present invention is illustrated. In accordance with this embodiment, a third winding in a differential transformer is not provided, rather, current imbalance is sensed as in FIGS. 7, 8 and 9 and compensating current is directly applied to the conductor pairs isolating the current sources/sinks from the conductor pairs with an appropriate inductor (e.g., 1 mH) as shown.

Note that not all of the current sources and sinks shown in FIG. 10 must be used to effectively cancel a current imbalance. As will be understood by those skilled in the art, there are four ways to do it using only two current sources/sinks: (1) a current source and a current sink attached to the "top" conductor of the pair; (2) a current source and a current sink attached to the "bottom" conductor of the pair; (3) a current source attached to each conductor of the pair; and (4) a current sink attached to each conductor of the pair.

Figure 11:
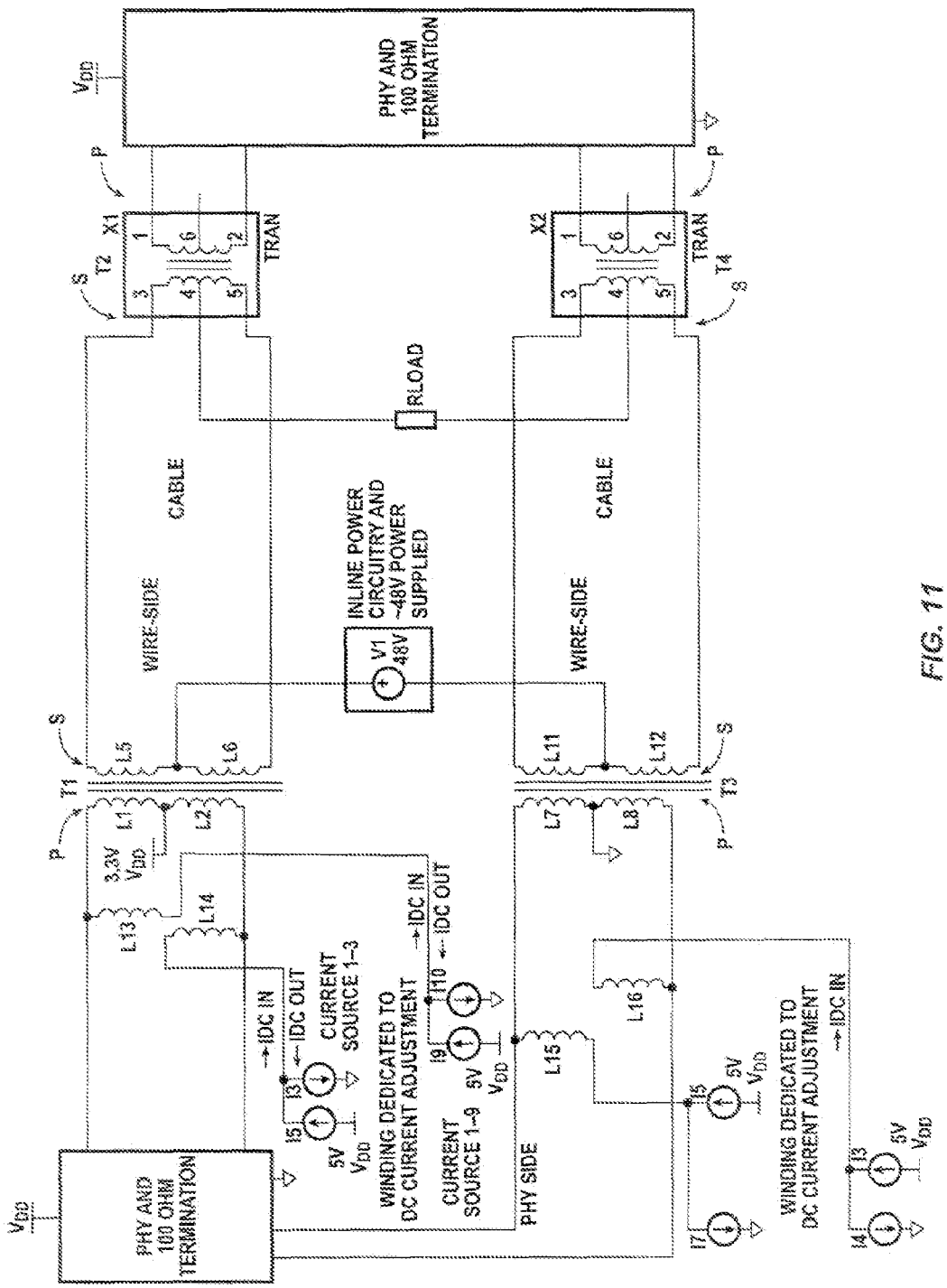

FIG. 11 illustrates another embodiment of the present invention wherein compensating current is directly applied to the primary of T1 instead of via a third winding. In this case a current source/sink is coupled to one or both ends of the primary as shown through an inductance. While two sets of current source/sinks are shown in this version, those of ordinary skill in the art will now appreciate that a number of different configurations could be employed. More specifically, the center tap of the primary of T1 is shown strapped to Vdd (typically 3.3 VDC in most PHYs) although it can instead be set to any convenient fixed voltage such as ground. The PHY steers DC current in and out of L1 and L2 (which are parts of the primary winding of magnetic device T1) during data transmission. Inductors L13 and L14 provide high AC impedance and low DC impedance so that current sources/sinks may be used to push DC current though L1 or L2 from a current source referenced to a higher supply, 5 VDC shown here, or pull current from L1 and L2 to ground (or a lower supply) via the L13 and L14 windings. Note that even though all the possible ways of delivering current in and out of L1 and L2 to cancel the effective current imbalance in the secondary (wire) side conductor pair and rebalance the magnetic, usually only one of these options will be exercised at a time, e.g., current source I3 may be used to sink current to ground though the L14 inductor, that is flowing really though L2 that is biased to 3.3 v at the center tap, OR current source I6 may be used to force current from the 5 v supply through L14 inductor and into L2 sinking the current into the 3.3 v supply at the center tap of the primary of T1. Other approaches may also be used and combinations may be used as well, if desired. The same details apply to L13. Note that current adjustment will typically occur at L13 OR L14 but not both. Similarly, current may be sinked into the 3.3 VDC supply or 0 VDC supply, but not both.

The same details apply to the receive winding that usually has its primary center-tap connected to ground as shown. Note that it is feasible to sink current from L14 (path would be 3.3 VDC supply into L2 into L14 via the I3 current source to ground while at the same time the effort could be assisted by forcing current into L1 via L13 into the 3.3 VDC supply originating from current source I9 and the 5 VDC supply). Such active adjustment may be used if desired but one would not want to pull current from L14 while trying to force current through L14. Also one would not want to pull current out of both L1 and L2 at the same time to ground through L14 and L13 for the purposes of canceling the error. Thus the current sources/sinks are used subject to the constraint that one uses either one side (L1 or L2) of the T1 primary winding to pull current in or out, but not both; or one may use either one side (e.g., L13) or the other (e.g., L14) but not both sides source/sink current to/from the primary winding of T1.

Figure 12:
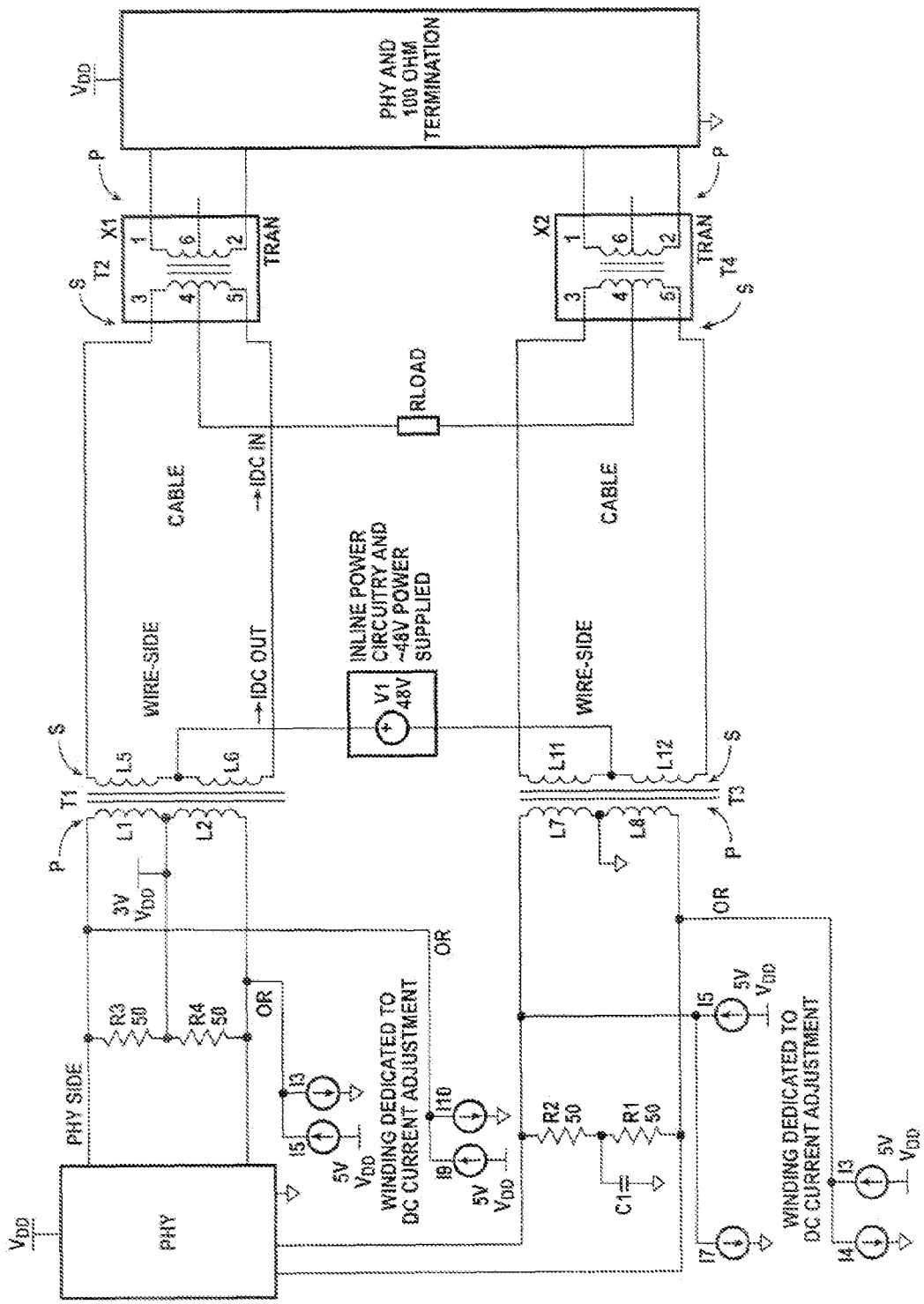

The embodiment illustrated in the schematic diagram of FIG. 12 is a slight variation on the embodiment of FIG. 11. In this version the two 50-ohm termination resistors R3 and R4 on the transmit side and R1 and R2 on the receive side are shown (although they would be present in all embodiments that operate with Ethernet). Note that for the purpose of the trim or adjustment we use DC current to adjust the current that usually flows through the much lower DC resistance of the windings. Here the current sources do the adjustment right across the typical Ethernet link on the primary side, the sources must look like a relatively high impedance. (e.g., more than 1000 ohms) up to 100 mhz and must be designed with low capacitance (i.e., no more than a few picofarads), and must keep the signal balanced since there is no isolation in this embodiment for the TX or the RX pairs. For the transmitter, usually a current source in inside the PHY steers AC data current at higher speeds. Effectively another DC current source is added so that it is ON when needed and only applies DC current as an offset. For the RX channel, since it is high impedance, past the 50 ohm terminations and into the PHY, again the current sources are much higher impedance than the 100 ohm by at least a ratio of 10 to 1 and are low capacitance.

Note that there may be a preference as to which configuration to use for tradeoff of cost, space and robustness based on which technology we are trying to work with, e.g., 10/100 or 1000 Base T; also at lower speeds one may opt to have no current compensation adjustment at all and/or such adjustments may be performed only in response to a detected Bit Error Rate increase.

Figure 13:
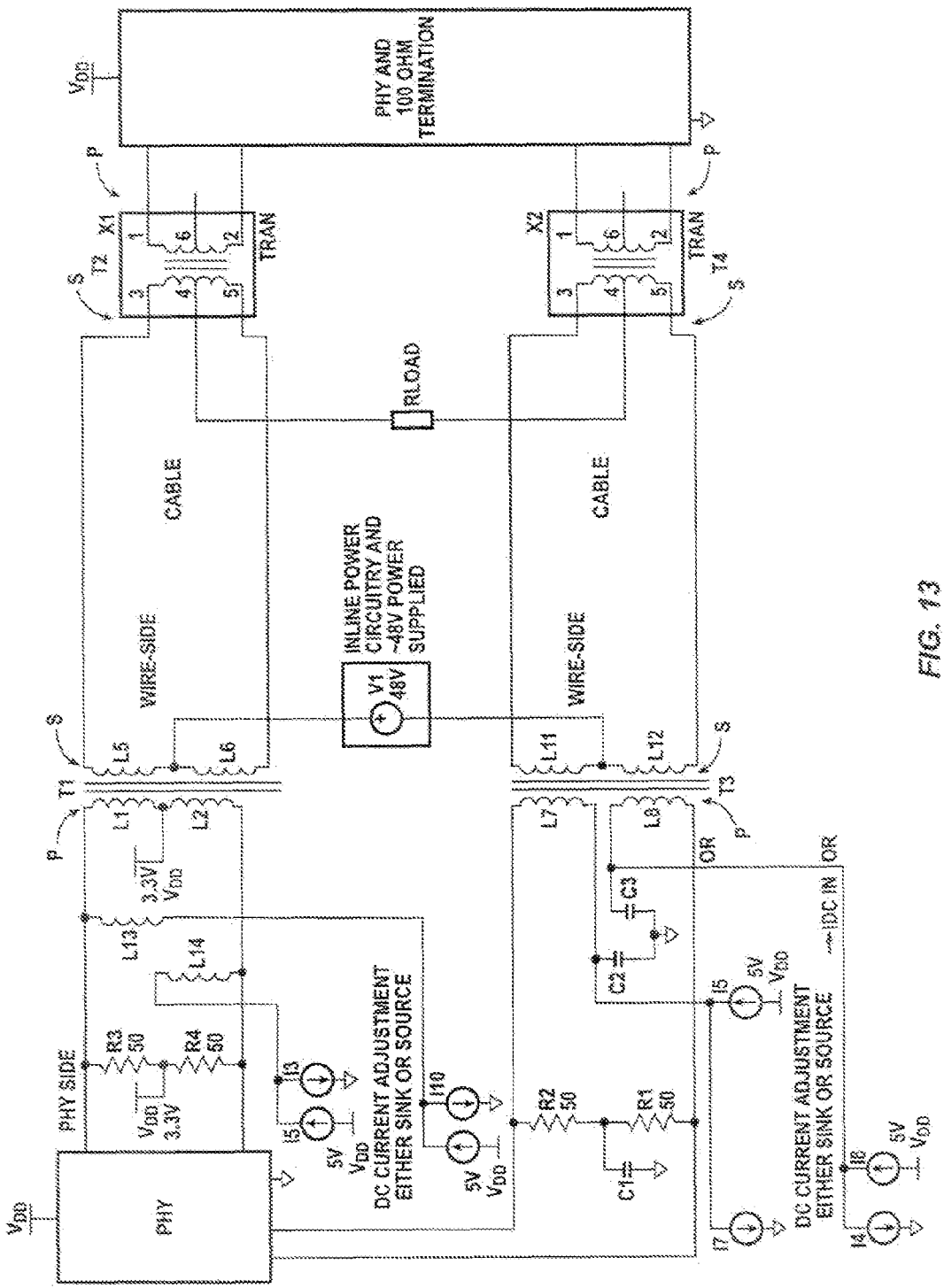

The embodiment illustrated in the schematic diagram of FIG. 13 is a slight variation on the embodiment of FIG. 12. In the FIG. 13 embodiment inductors L13 and L14 are added back (as from FIG. 11) on the transmit channel, and the same concepts as discussed with respect to FIG. 12 apply except that the transmit channel AC (data) signals are isolated with inductors L13/L14 giving the PHY designer the chance to design a current source that may be more capacitive and potentially correcting for a higher offset or error, i.e., one providing much higher DC current correction. As for the receive channel, while it could be configured like the transmit channel, in this version the center-tap is split on the primary side as shown which avoids the need for a dedicated winding to do the job. Capacitors C2 and C3 to ground eliminate common mode noise, and the current adjustment takes place as discussed above.

It should be noted that since many PHYs have time domain reflectometers (TDRs) built into them now for various diagnostic purposes, the TDR may be used to determine the length of the attached cable and based thereon, the decision on whether or not to current correct a pair of conductors can be made. Since adjusting the current imbalance is generally more important for short cables, if the TDR reports a sufficiently long cable, the process could be foregone.

Figure 14:
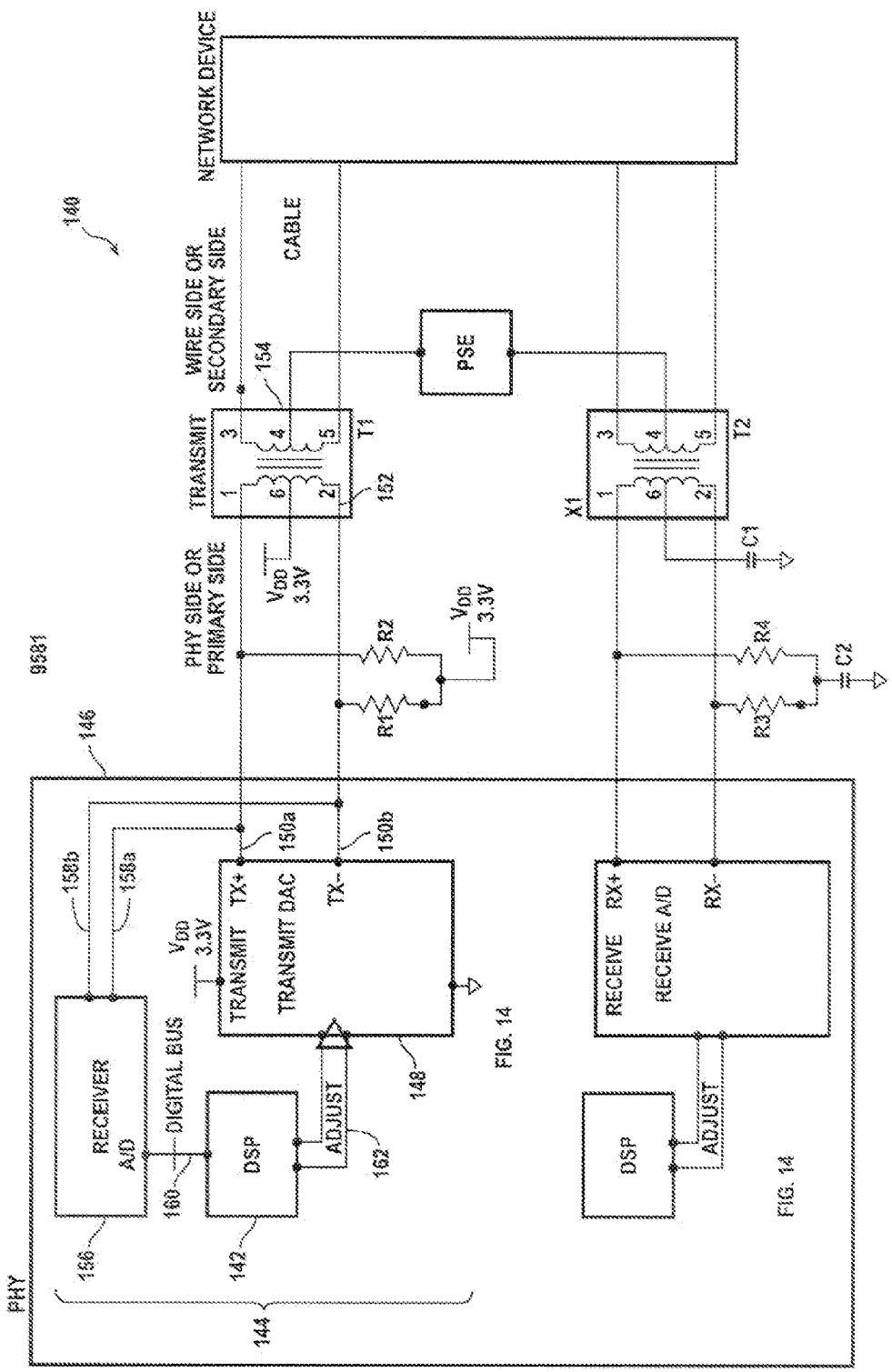
FIG. 14 is an electrical schematic diagram of a portion of a transmitter section of an apparatus in accordance with an embodiment of the present invention.

FIG. 14 illustrates a variation 140 of the approach shown in FIG. 4C and utilizes a digital signal processor (DSP) 142 or equivalent circuitry on the transmit portion 144 of the PHY 146. The transmitter (transmit DAC (current-output digital analog converter)) 148 transmits a differential analog signal on lines 150a, 150b to the primary 152 of transmit transformer T1 154. Receiver 156 is coupled to receive the output of transmitter 148 on lines 150a, 150b via lines 158a, 158b. Receiver 156 outputs a digital version of the signal from transmitter 148 to an input 160 of DSP 142. The digital output on line 162 of DSP 142 constitutes a feedback signal. Test pulses can be initiated, for example, in transmitter 148. These pulses become distorted if there is an effective current imbalance. The receiver 156 senses this and in conjunction with DSP 142 causes a correction to the signal so that after a few pulses have been sent and sensed, the transmit portion 144 of the PHY 146 is able to send a predistorted signal that looks perfect or near perfect upon passing through transformer T1 (154).

Figure 15:
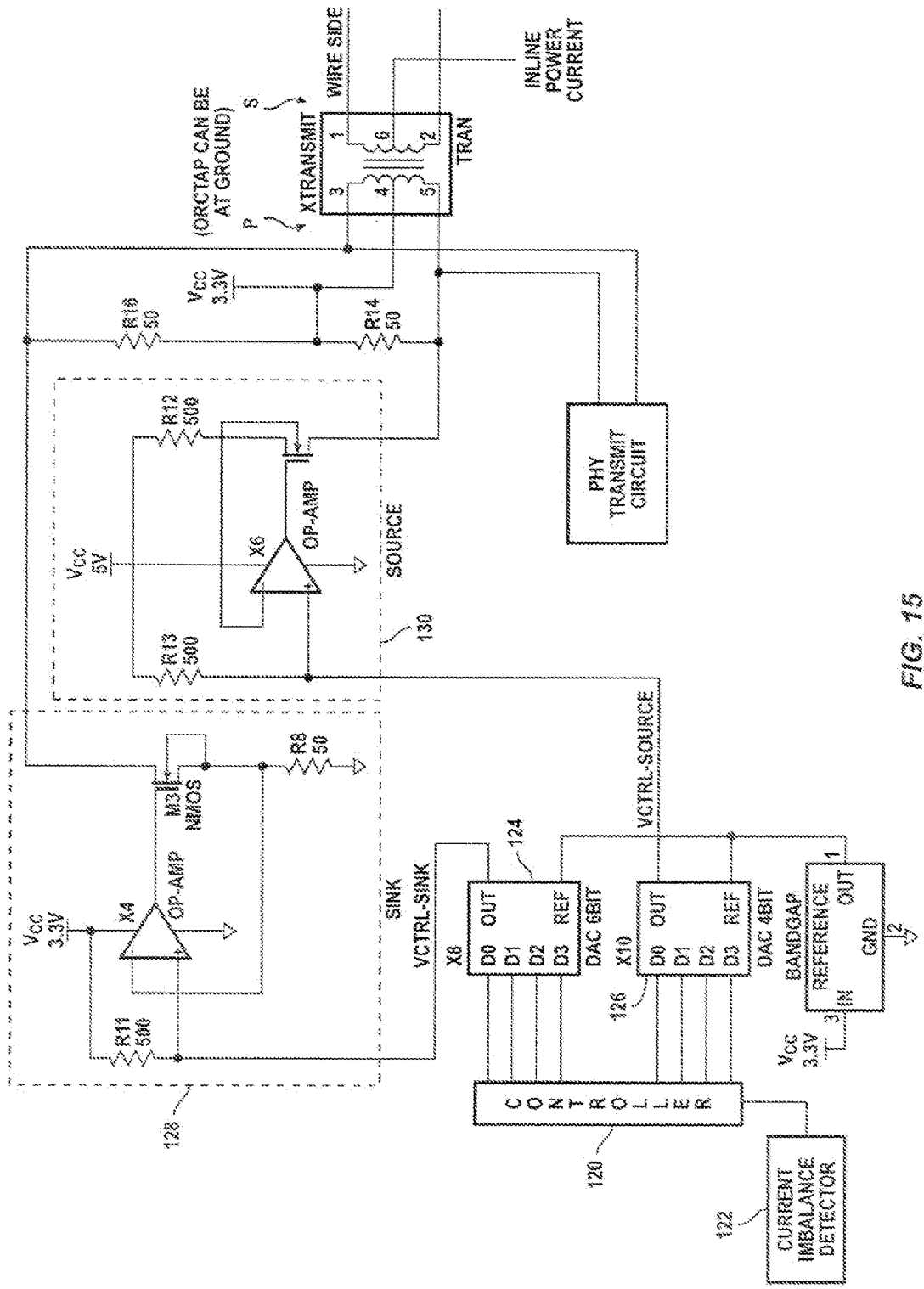
FIG. 15 is an electrical schematic diagram of a current imbalance detection and injection circuit in accordance with an embodiment of the present invention.

FIG. 15 is an electrical schematic diagram which illustrates an example of a circuit for providing current sink/current source capability for the circuits described in more detail above. This is just one example and many other equivalent circuits may be used which are capable of sinking or sourcing current. In FIG. 15, a controller 120 is coupled to a current imbalance detector 122 which may be of a type adapted for direct measurement of current imbalance (wire side current sensors) or indirect measurement of effective current imbalance (droop detection) as described in more detail above.

Controller 120 is coupled to a pair of voltage DACs (digital to analog converters with voltage outputs) 124 and 126. These pass a signal to conventional current sink circuit block 128 and current source circuit block 130, respectively, which are arranged to drive a bias current in either direction. Note that node CTAP may alternatively be grounded or set to some other fixed voltage level. As discussed above, a current sink/source circuit may be located in various places in the circuit to achieve the corrective action described herein and various types of sensing may be used to cause it to act.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A power sourcing equipment (PSE) apparatus, comprising:
a first magnetic device having a primary winding and a secondary winding;
a coupler for receiving a pair of conductors, the coupler coupled to the secondary winding of the first magnetic device;
power sourcing circuitry coupled to apply a common mode inline power voltage signal to the secondary winding of the first magnetic device;
circuitry for detecting an effective current imbalance in the pair of conductors; and
circuitry for applying, responsive to the circuitry for detecting, a direct current bias to a circuit element comprising the coupler and the secondary winding of the first magnetic device in a magnitude and direction to compensate for the current imbalance, wherein the circuitry for applying is configured to utilize a third winding of the first magnetic device.

2. The PSE of claim 1, wherein the third winding is disposed on the primary side of the first magnetic device.

3. The PSE of claim 2, wherein the circuitry for detecting is configured to sense the effective current imbalance indirectly by monitoring pulses received through the primary winding of the first magnetic device.

4. The PSE of claim 2, wherein the circuitry for detecting is configured to sense the effective current imbalance directly by measuring current flow through at least two locations of the circuit element and comparing the measurements to create an error signal applied to drive the magnitude and direction of the direct current bias.

5. The PSE of claim 1, wherein the third winding is disposed on the secondary side of the first magnetic device.

6. The PSE of claim 5, wherein the circuitry for detecting is configured to sense the effective current imbalance indirectly by monitoring pulses received through the primary winding of the first magnetic device.

7. The PSE of claim 5, wherein the circuitry for detecting is configured to sense the effective current imbalance directly by measuring current flow through at least two locations of the circuit element and comparing the measurements to create an error signal applied to drive the magnitude and direction of the direct current bias.

8. The PSE of claim 1, wherein the circuitry for detecting is configured to sense the effective current imbalance indirectly by monitoring pulses received through the primary winding of the first magnetic device.

9. The PSE of claim 1, wherein the circuitry for detecting is configured to sense the effective current imbalance directly by measuring current flow through at least two locations of the circuit element and comparing the measurements to create an error signal applied to drive the magnitude and direction of the direct current bias.

10. A power sourcing equipment (PSE) apparatus, comprising:
   a first magnetic device having a primary winding and a secondary winding;
   a coupler for receiving a pair of conductors, the coupler coupled to the secondary winding of the first magnetic device;
   power sourcing circuitry coupled to apply a common mode inline power voltage signal to the secondary winding of the first magnetic device;
   circuitry for detecting an effective current imbalance in the pair of conductors; and
   circuitry for applying, responsive to the circuitry for detecting, a direct current bias to a circuit element comprising the coupler and the secondary winding of the first magnetic device in a magnitude and direction to compensate for the current imbalance, wherein the circuitry for detecting is configured to sense the effective current imbalance indirectly by monitoring data pulses received through the primary winding of the first magnetic device.

11. A power sourcing equipment (PSE) apparatus, comprising:
   a first magnetic device having a primary winding and a secondary winding;
   a coupler for receiving a pair of conductors, the coupler coupled to the secondary winding of the first magnetic device;
   power sourcing circuitry coupled to apply a common mode inline power voltage signal to the secondary winding of the first magnetic device;
   circuitry for detecting an effective current imbalance in the pair of conductors; and
   circuitry for applying, responsive to the circuitry for detecting, a direct current bias to a circuit element comprising the coupler and the secondary winding of the first magnetic device in a magnitude and direction to compensate for the current imbalance, wherein the circuitry for detecting is configured to sense the effective current imbalance indirectly by means of droop detection pulses transmitted by a PHY through the primary winding of the first magnetic device.

12. The PSE of claim 11, wherein a receiver attached to the PHY is configured to monitor the droop detection pulses as they are transmitted by a transmitter at the PHY.

13. A power sourcing equipment (PSE) apparatus, comprising:
   a first magnetic device having a primary winding and a secondary winding;
   a coupler for receiving a pair of conductors, the coupler coupled to the secondary winding of the first magnetic device;
   power sourcing circuitry coupled to apply a common mode inline power voltage signal to the secondary winding of the first magnetic device;
   circuitry for detecting an effective current imbalance in the pair of conductors; and
   circuitry for applying, responsive to the circuitry for detecting, a direct current bias to a circuit element comprising the coupler and the secondary winding of the first magnetic device in a magnitude and direction to compensate for the current imbalance, wherein the circuitry for detecting is configured to sense the effective current imbalance directly by measuring current flow through at least two locations of the circuit element and comparing the measurements to create an error signal applied to drive the magnitude and direction of the direct current bias.

14. The PSE of claim 13, wherein the circuitry for applying is configured to inject a current at a node disposed in the circuit element.

15. A power sourcing equipment (PSE) apparatus, comprising:
   a first magnetic device having a primary winding and a secondary winding;
   a coupler for receiving a pair of conductors, the coupler coupled to the secondary winding of the first magnetic device;
   power sourcing circuitry coupled to apply a common mode inline power voltage signal to the secondary winding of the first magnetic device;
   circuitry for detecting an effective current imbalance in the pair of conductors; and
   circuitry for applying, responsive to the circuitry for detecting, a direct current bias to a circuit element comprising the coupler and the secondary winding of the first magnetic device in a magnitude and direction to compensate for the current imbalance, wherein the circuitry for applying is configured to inject a current at a node disposed in the circuit element.

16. A powered device (PD) apparatus, comprising:
   a second magnetic device having a primary winding and a secondary winding;
   a coupler for receiving a pair of conductors coupled to a secondary winding of a remote first magnetic device, the coupler coupled to the secondary winding of the second magnetic device;
   powered device circuitry coupled to receive a common mode inline power voltage signal from the secondary winding of the second magnetic device;
   circuitry for detecting an effective current imbalance in the pair of conductors; and
   circuitry for applying, responsive to the circuitry for detecting, a direct current bias to a circuit element comprising the coupler and the secondary winding of the second magnetic device in a magnitude and direction to compensate for the effective current imbalance, wherein the circuitry for applying is configured to utilize a third winding of the second magnetic device.

17. The PD of claim 16, wherein the third winding is disposed on the primary side of the second magnetic device.

18. The PD of claim 17, wherein the circuitry for detecting is configured to sense the effective current imbalance indirectly by monitoring pulses received through the primary winding of the second magnetic device.

19. The PD of claim 17, wherein the circuitry for detecting is configured to sense the effective current imbalance directly by measuring current flow through at least two locations of the circuit element and comparing the measurements to create an error signal applied to drive the magnitude and direction of the direct current bias.

20. The PD of claim 16, wherein the third winding is disposed on the secondary side of the second magnetic device.

21. The PD of claim 20, wherein the circuitry for detecting is configured to sense the effective current imbalance indirectly by monitoring pulses received through the primary winding of the second magnetic device.

22. The PD of claim 20, wherein the circuitry for detecting is configured to sense the effective current imbalance directly by measuring current flow through at least two locations of the circuit element and comparing the measurements to create an error signal applied to drive the magnitude and direction of the direct current bias.

23. The PD of claim 16, wherein the circuitry for detecting is configured to sense the effective current imbalance indirectly by monitoring pulses received through the primary winding of the second magnetic device.

24. The PD of claim 16, wherein the circuitry for detecting is configured to sense the effective current imbalance directly by measuring current flow through at least two locations of the circuit element and comparing the measurements to create an error signal applied to drive the magnitude and direction of the direct current bias.

25. A powered device (PD) apparatus, comprising:
a second magnetic device having a primary winding and a secondary winding;
a coupler for receiving a pair of conductors coupled to a secondary winding of a remote first magnetic device, the coupler coupled to the secondary winding of the second magnetic device;
powered device circuitry coupled to receive a common mode inline power voltage signal from the secondary winding of the second magnetic device;
circuitry for detecting an effective current imbalance in the pair of conductors; and
circuitry for applying, responsive to the circuitry for detecting, a direct current bias to a circuit element comprising the coupler and the secondary winding of the second magnetic device in a magnitude and direction to compensate for the effective current imbalance, wherein the circuitry for detecting is configured to sense the effective current imbalance indirectly by monitoring data pulses received through the primary winding of the second magnetic device.

26. A powered device (PD) apparatus, comprising:
a second magnetic device having a primary winding and a secondary winding;
a coupler for receiving a pair of conductors coupled to a secondary winding of a remote first magnetic device, the coupler coupled to the secondary winding of the second magnetic device;
powered device circuitry coupled to receive a common mode inline power voltage signal from the secondary winding of the second magnetic device;
circuitry for detecting an effective current imbalance in the pair of conductors; and
circuitry for applying, responsive to the circuitry for detecting, a direct current bias to a circuit element comprising the coupler and the secondary winding of the second magnetic device in a magnitude and direction to compensate for the effective current imbalance, wherein the circuitry for detecting is configured to sense the effective current imbalance indirectly by means of droop detection pulses transmitted by a PHY through the primary winding of the second magnetic device.

27. The PD of claim 26, wherein a receiver attached to the PHY is configured to monitor the droop detection pulses as they are transmitted by a transmitter at the PHY.

28. A powered device (PD) apparatus, comprising:
a second magnetic device having a primary winding and a secondary winding;
a coupler for receiving a pair of conductors coupled to a secondary winding of a remote first magnetic device, the coupler coupled to the secondary winding of the second magnetic device;
powered device circuitry coupled to receive a common mode inline power voltage signal from the secondary winding of the second magnetic device;
circuitry for detecting an effective current imbalance in the pair of conductors; and
circuitry for applying, responsive to the circuitry for detecting, a direct current bias to a circuit element comprising the coupler and the secondary winding of the second magnetic device in a magnitude and direction to compensate for the effective current imbalance, wherein the circuitry for detecting is configured to sense the effective current imbalance directly by measuring current flow through at least two locations of the circuit element and comparing the measurements to create an error signal applied to drive the magnitude and direction of the direct current bias.

29. The PD of claim 28, wherein the circuitry for applying is configured to inject a current at a node disposed in the circuit element.

30. A powered device (PD) apparatus, comprising:
a second magnetic device having a primary winding and a secondary winding;
a coupler for receiving a pair of conductors coupled to a secondary winding of a remote first magnetic device, the coupler coupled to the secondary winding of the second magnetic device;
powered device circuitry coupled to receive a common mode inline power voltage signal from the secondary winding of the second magnetic device;
circuitry for detecting an effective current imbalance in the pair of conductors; and
circuitry for applying, responsive to the circuitry for detecting, a direct current bias to a circuit element comprising the coupler and the secondary winding of the second magnetic device in a magnitude and direction to compensate for the effective current imbalance, wherein the circuitry for applying is configured to inject a current at a node disposed in the circuit element.

* * * * *